United States Patent
Dawley et al.

(10) Patent No.: US 11,171,391 B2
(45) Date of Patent: Nov. 9, 2021

(54) BATTERY ASSEMBLY AND METHOD

(71) Applicant: GM GLOBAL TECHNOLOGY OPERATIONS LLC, Detroit, MI (US)

(72) Inventors: Evan J. Dawley, Bloomfield Hills, MI (US); Hongliang Wang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 151 days.

(21) Appl. No.: 16/564,378

(22) Filed: Sep. 9, 2019

(65) Prior Publication Data

US 2021/0074985 A1    Mar. 11, 2021

(51) Int. Cl.
*H01M 50/502* (2021.01)
*H01M 50/20* (2021.01)
*H01M 50/531* (2021.01)

(52) U.S. Cl.
CPC ......... *H01M 50/502* (2021.01); *H01M 50/20* (2021.01); *H01M 50/531* (2021.01); *H01M 2220/20* (2013.01)

(58) Field of Classification Search
CPC .. H01M 50/502; H01M 50/50; H01M 50/531; H01M 50/20; H01M 50/514; H01M 50/538; H01M 50/54; H01M 50/172; H01M 2220/20
See application file for complete search history.

(56) References Cited

U.S. PATENT DOCUMENTS

| 8,501,340 | B2 * | 8/2013 | Kim | H01M 50/502 |
| | | | | 429/160 |
| 2010/0224671 | A1 | 9/2010 | Scheuerman et al. | |
| 2011/0052969 | A1 * | 3/2011 | Cai | H01M 50/543 |
| | | | | 429/158 |
| 2012/0000964 | A1 | 1/2012 | Sigler et al. | |
| 2013/0029206 | A1 * | 1/2013 | Lev | B23K 15/10 |
| | | | | 429/161 |
| 2015/0132622 | A1 * | 5/2015 | Gohl | H01M 50/54 |
| | | | | 429/90 |
| 2015/0263326 | A1 | 9/2015 | Gunther et al. | |
| 2019/0319295 | A1 * | 10/2019 | Kim | H01M 50/15 |
| 2020/0014006 | A1 * | 1/2020 | Oliveira | H01M 10/653 |
| 2020/0144582 | A1 * | 5/2020 | Guo | H01M 50/54 |

(Continued)

FOREIGN PATENT DOCUMENTS

| JP | 2007144436 A | 6/2007 | |
| WO | WO-2006109610 A1 * | 10/2006 | ............ H01M 50/20 |
| WO | WO-2019069944 A1 * | 4/2019 | ............ H01M 50/54 |

OTHER PUBLICATIONS

English Translation of WO 2006109610 (Year: 2006).*

(Continued)

*Primary Examiner* — Kwang Han
*Assistant Examiner* — Adam J Francis
(74) *Attorney, Agent, or Firm* — Lorenz & Kopf LLP

(57) ABSTRACT

Assemblies and methods are provided for manufacturing a battery. A number of cells each have tabs for coupling the cell in the battery assembly. A housing has an opening through which each tab extends. The tabs are folded to overlie an outer surface of the housing. A bus bar is disposed on an opposite side of the tabs from the housing, with a coupling joint between the bus bar and the cells. The coupling joint may comprise a weld.

20 Claims, 7 Drawing Sheets

(56) References Cited

U.S. PATENT DOCUMENTS

2020/0259158 A1* 8/2020 Motohashi ............ H01M 50/20
2020/0381685 A1* 12/2020 Yanagihara ......... H01M 50/572

OTHER PUBLICATIONS

Hu, Jack S. (2011). Lithium Ion Battery Manufacturing. Department of Mechanical Engineering. The University of Michigan.

* cited by examiner

BATTERY ASSEMBLY AND METHOD

INTRODUCTION

The present disclosure generally relates to battery assemblies and more specifically, to assemblies and methods for effectively connecting the individual cells of a battery together for efficient and durable electrical conduction.

Battery packs, such as those used in electrified vehicles typically include a large number discrete battery cells. The battery cells are made with a variety of different materials, chemistries and are formed in various configurations. Battery packs typically use battery cells of a cylindrical, prismatic, ultra-capacitor, or pouch type. The many individual cells are connected in series and/or parallel to produce the total voltage and current requirements of the application.

During manufacturing, a number of cells are typically assembled in modules. Several modules are then typically assembled into a pack that provides the current and voltage requirements of the application. Conductors that extend from each cell are typically used to connect the cells together. The conductors facilitate the necessary cell connections to the electrical system through which the cell energy is supplied to external sources.

Joining of battery cells together is challenging. The cells are typically joined together to complete the electrical path for current flow. Joining challenges arise due to the highly conductive materials used, the potential joining of dissimilar materials, and multiple layers with different material thicknesses. The efficient operation and the durability of the battery assembly rely on quality joining.

Accordingly, it is desirable to provide assemblies and methods that overcome the challenges associated with the assembly of multiple cells efficiently and effectively. Furthermore, other desirable features and characteristics of the present invention will become apparent from the subsequent detailed description and the appended claims, taken in conjunction with the accompanying drawings and the foregoing technical field and background.

SUMMARY

In various embodiments, assemblies and methods are provided for manufacturing a battery. In an assembly, a number of cells are included with each cell having tabs for coupling the cell in the assembly. A housing has an opening through which each tab extends. The tabs are folded to overlie an outer surface of the housing. A bus bar is disposed on an opposite side of the tabs from the housing, with a coupling joint between the bus bar and the cells.

In additional embodiments, the coupling joint is a weld that is wider in the bus bar than in the tabs.

In additional embodiments, the tabs include a stacked section where the tabs are ganged together, are disposed proximate one another, and are folded approximately parallel to the outer surface.

In additional embodiments, some tabs are copper and some tabs are aluminum. The bus bar connects between the copper tabs and the aluminum tabs.

In additional embodiments, the bus bar is made of a bimetallic material.

In additional embodiments, a void is formed in the housing, is disposed proximate the coupling joint, and opens toward the tabs.

In additional embodiments, a terminal is made of a similar material as one of the cell tabs, is disposed between the housing and the tabs, and is welded to one or more cell tabs in the coupling process.

In additional embodiments, some tabs are made of aluminum with an outer oxide layer.

In additional embodiments, the assembly is a module that includes a number of the cells with the tabs aligned along the module.

In additional embodiments, some tabs are folded opposite other tabs in a bi-directional folded orientation, pointing toward one another or the tabs are folded unidirectionally pointing in a common direction.

In various other embodiments, a method of assembling a battery includes forming a number of cells, each having tabs for coupling the cell in the battery. Each tab extends through an opening of a housing. The tabs are folded to overlie an outer surface of the housing. A bus bar is positioned on an opposite side of the tabs from the housing. A coupling joint is formed between the bus bar and the cells.

In additional embodiments, the coupling joint is formed by directing a weld first through the bus bar and then into the tabs, and forming the weld wider in the bus bar than in the tabs.

In additional embodiments, a stacked section of the tabs is formed where the tabs are ganged together, are disposed proximate one another, and are folded approximately parallel to the outer surface.

In additional embodiments, some tabs are made of copper and some tabs are made of aluminum. The bus bar connects between the copper tabs and the aluminum tabs.

In additional embodiments, the bus bar is formed of a homogenous material.

In additional embodiments, the housing includes a void disposed proximate the coupling joint and opening toward the tabs.

In additional embodiments, a terminal is disposed between the housing and the tabs and is made of a like material as one of the cell tabs.

In additional embodiments, a number of the cells are assembled in a module with the tabs aligned along the module.

In additional embodiments, some tabs are folded opposite other tabs in a bi-directional folded orientation, pointing toward one another or the tabs are folded unidirectionally pointing in a common direction.

In additional embodiments, a battery assembly includes one group of cells with tabs ganged together in a stacked section where the tabs are disposed adjacent one another. Another group of cells is included with tabs ganged together in another stacked section where the tabs are disposed adjacent one another. A housing has openings through which the tabs extend. The tabs of the two groups are folded to overlie an outer surface of the housing, and the tabs of the two groups are folded in opposite directions. A bus bar is disposed on an opposite side of the tabs from the housing. A welded coupling joint is formed between the bus bar and the tabs of the two groups of cells.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, assemblies and methods for battery manufacturing provide for the joining of cell tabs to bus bars in an efficient manufacturing process that results in an assembly with desirable performance characteristics. Bus bars, which may be formed of a heavier material than the cell tabs, are placed on top of a gang of tabs and the weld energy is directed first through the bus bar and then into the tabs. This arrangement enables the use of a relatively light and compact bus bar with smaller physical dimension than other approaches. This is because the structural arrangement of the bus bar and tabs requires that only a fraction of the tabs be covered by the bus bar, sufficient to create a coupling joint. When connecting the bus bar and the tabs, the relatively lighter tabs are subjected to lower heat than the bus bar and desirable weld quality is achieved. Directing the weld first through the bus bar and then into the tabs results in a fused area that is larger near the bus bar, so the current collected from the cells during operation of the battery is provided with a larger flow path where the current is larger. As a result, relatively low heat is generated and desirable performance and durability is achieved. The disclosed assembly and method are beneficial for welding dissimilar metals frequently found in battery assemblies and is adaptable to various cell tab configurations. For example, in order to join a positive cell tab to a negative cell tab, two dissimilar metals such as copper and aluminum are often encountered and may be connected by way of a homogenous busbar made of either copper or aluminum. However, the currently disclosed assemblies and methods are also beneficial in connecting only similar metals such as when bimetallic bus bars are utilized.

Figure 1:
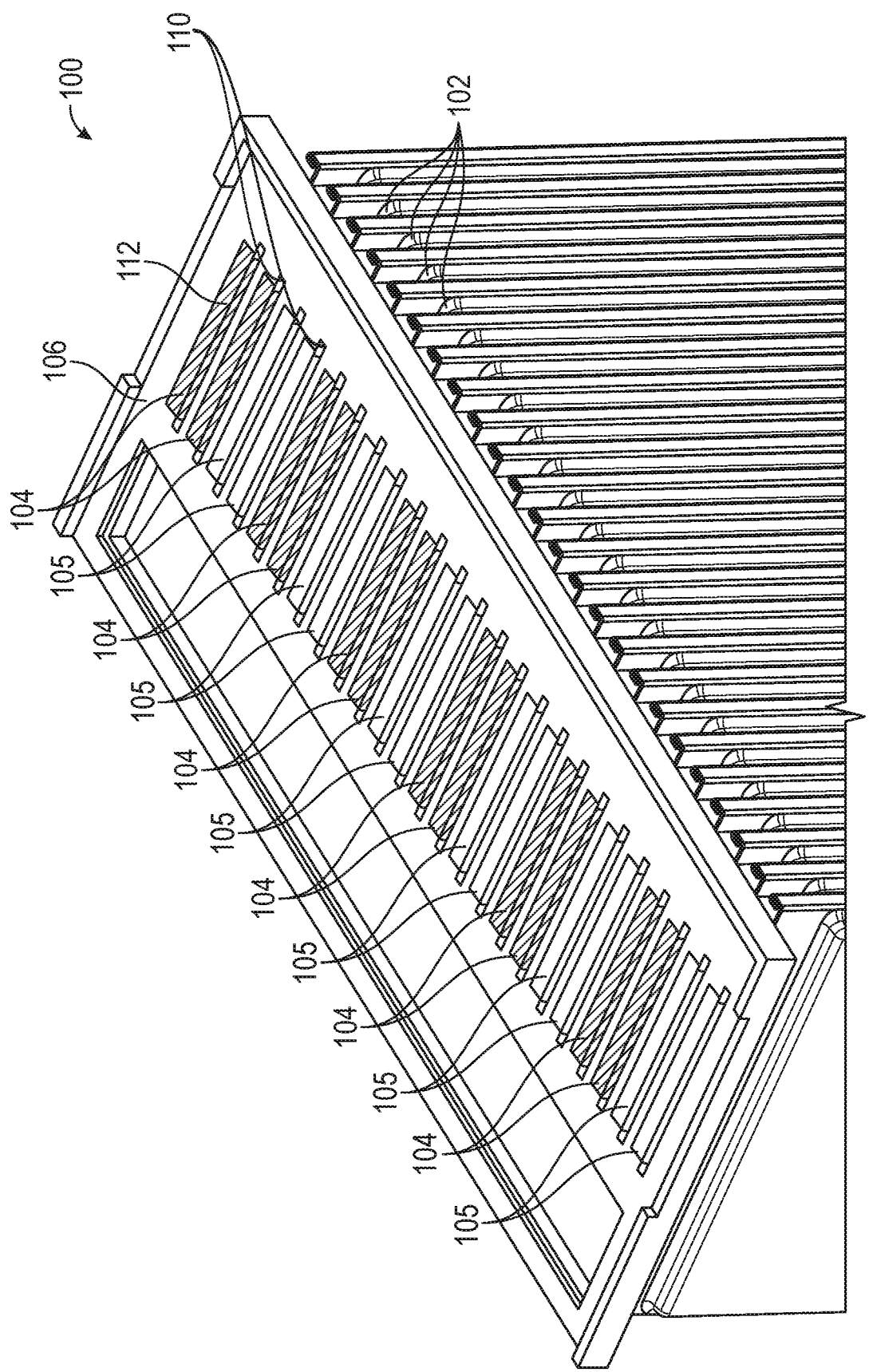
FIG. 1 is a fragmentary perspective view of a battery module, in accordance with various embodiments.

With reference to FIG. 1, illustrated is a battery module 100 that generally comprises a number of battery cells 102, which include tabs 104 and a housing 106. The module 100 may be a stand-alone unit or may be one of several similar modules assembled in a battery pack. For example, for high voltage applications several modules 100 may be used to supply the power requirements. As an example, when the module 100 is used in a vehicle application for use with a traction motor, several modules 100 may be assembled together in a battery pack. Although this disclosure may refer to vehicle applications, it is in no way limited to those applications and is instead applicable whenever effective connections are required between battery cells and the load supplied by those cells.

As shown in FIG. 1, the cells 102 are of a pouch type construction and are prepared for being coupled together as described below. However, the current description is not limited to pouch type cells 102. In this embodiment, pouch type cells 102 are used due to their compactness and high spatial efficiency. They may comprise laminates of several thin metal film layers. Internal electrode leads from individual anode and cathode layers are attached to the respective anode tabs 104 and cathode tabs 105 by way of welding. The tabs 104, 105 extend through slots 110 in the housing 106 and in the current embodiment, are bent to present a flat area 112 outside the housing 106. As will be described below, each flat area 112 comprises a number of tabs 104, 105 from a number of cells 102 that are ganged together and bent over one another to form a number of stacked sections. In the embodiment of FIG. 1, the tabs 104, 105 are all bent in the same direction (unidirectionally), and are aligned along the module 100 in a straight row. In other embodiments, the tabs may be bent bi-directionally. In addition, in some embodiments, each slot 110 may have two tabs projecting out of the housing 106, such as a positive and negative tab for each cell 102. As another example, there may be a number of positive or negative tabs extending through any give slot, whereby the associated cells 102 would be electrically connected in parallel. As is apparent from FIG. 1, the tabs 104, 105 of individual cells 102 are not connected together in this view of a subassembly. To make those connections, bus bars (FIG. 3) are assembled to the module 100 as described herein.

Figure 2:
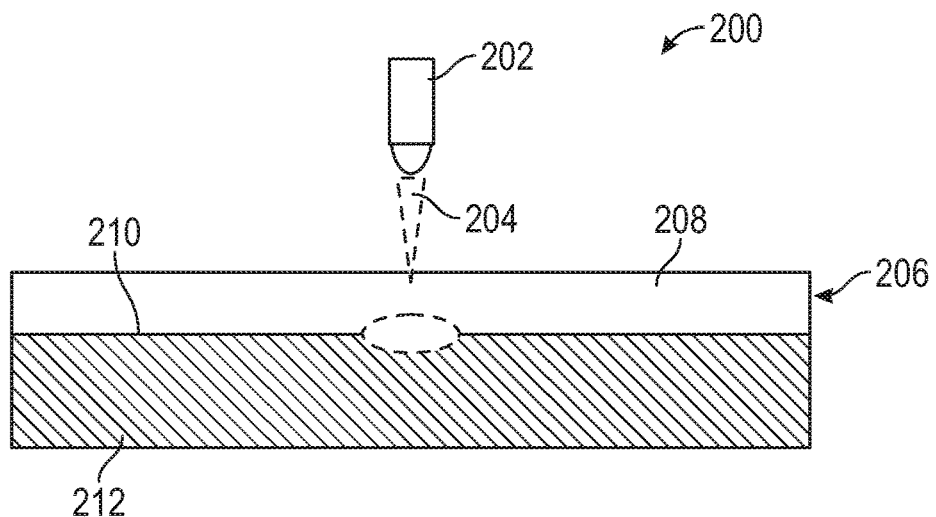
FIGS. 2, 3 and 4 are schematic, cross sectional illustrations of a welding apparatus processing a workpiece, in accordance with various embodiments.
Figure 3:
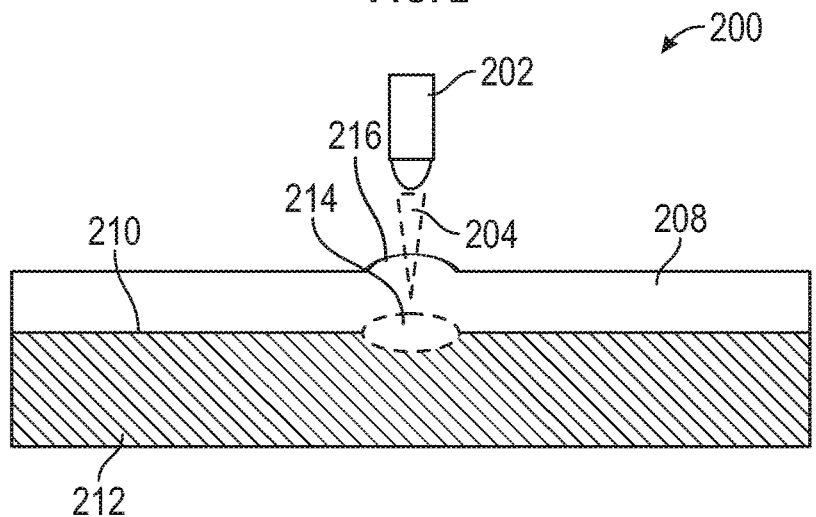
Figure 4:
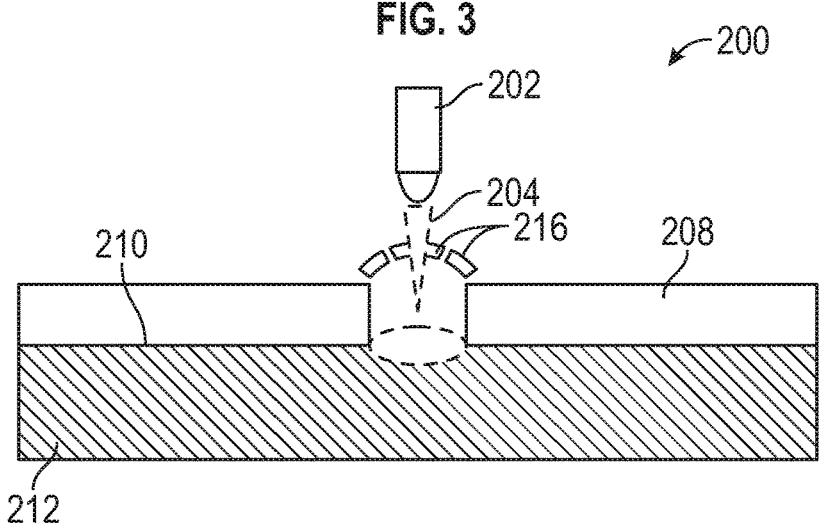

Prior to describing details of the connections between bus bars and tabs, reference is directed to FIGS. 2-4 for a description of the discoveries useful in understanding the advantages of the current disclosure. FIG. 2 illustrates a welding apparatus processing a workpiece at a process step 200 where a laser welding apparatus 202 directs/shoots an energy beam 204 at an aluminum tab 206. The aluminum tab 206 has a layer of aluminum oxide 208 on the surface 210 of the aluminum 212. In a number of embodiments, the aluminum 212 is anodized for corrosion protection purposes, which forms the aluminum oxide layer 208. In other embodiments, the oxide 208 may be formed in other ways, such as due to exposure to the atmosphere. The aluminum oxide 208 resists absorption of the energy beam 204. Accordingly, as shown in FIG. 3, the energy beam 204 is absorbed by the aluminum 212 and the aluminum oxide layer 210 act as barrier to the escape of the resulting heat. For example, as schematically illustrated, a hot molten/vaporized bead 214 is trapped by a shell 216 of aluminum oxide 208. As shown in FIG. 4, when the trapped pressure reaches an unsustainable level, the layer of aluminum oxide 208 ruptures. As a result, it has been found that direct application of a laser welding energy beam 204 to an anodized aluminum tab results in undesirable weld quality with undesirable porosity. When there are multiple anodized layers in the weld stack-up, such as when multiple tabs 104, 105 overlay one another, laser welding produces additional porosity. The results may lead to poor conduction quality and brittleness.

Figure 5:
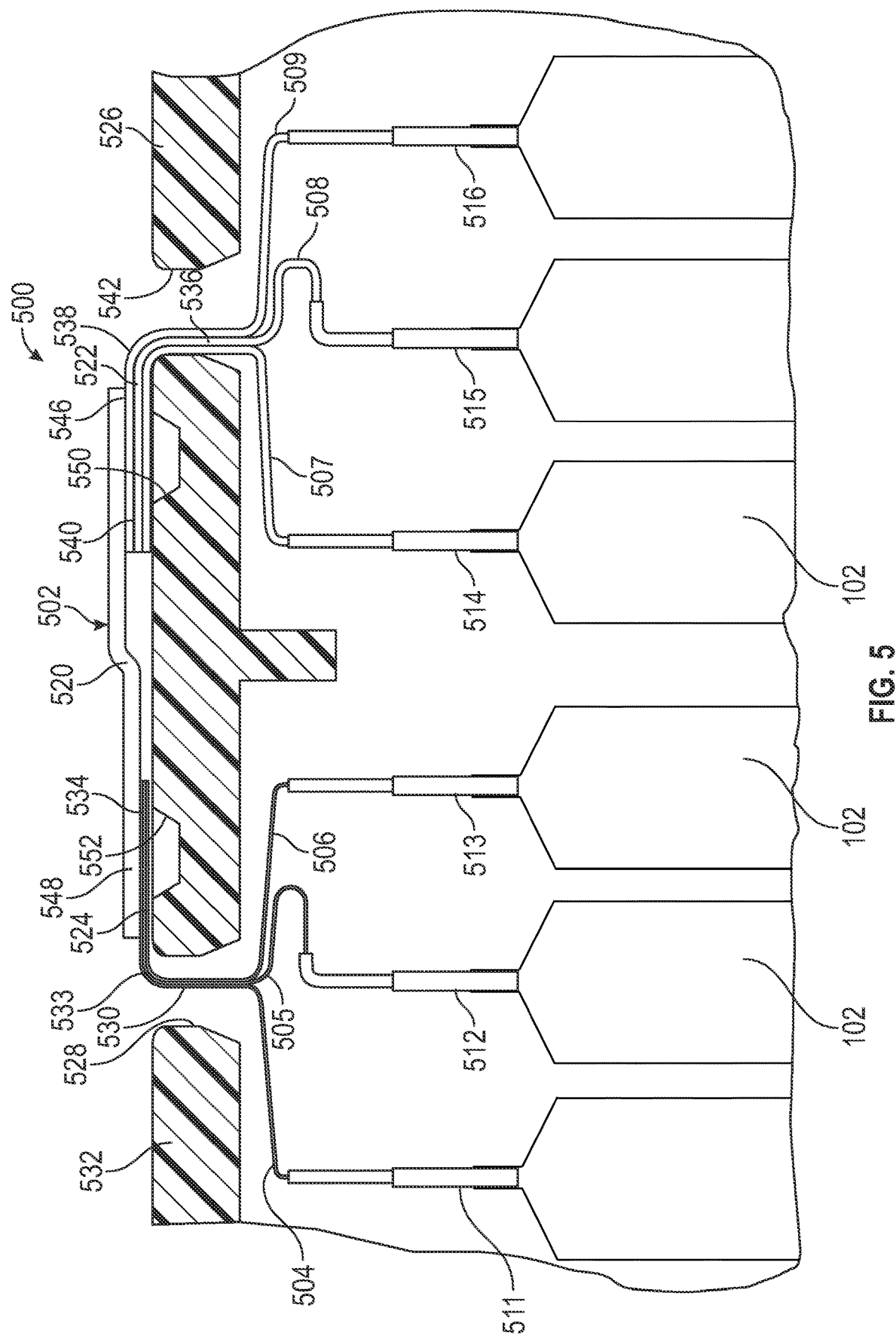
FIG. 5 is a schematic, cross sectional illustration of the battery module, such as that of FIG. 1, in accordance with various embodiments.

As illustrated in FIG. 5, the assembly of a battery module 500 is shown schematically in greater detail. The aspects of the battery module 500 may be used with the battery module 100 of FIG. 1. In the current illustration, a bus bar 502 is included with the module 500 connecting together six cell terminals that have tabs 504-509. The cell tabs 504-509 are each connected to their respective cell 102 (FIG. 1), by a respective connection 511-516. The tabs 504-506 are bent to the right as illustrated, and the tabs 507-509 are bent to the left as illustrated. Accordingly, the tabs are bent bi-directionally in opposite directions, in this example facing toward each other. The battery module 500 includes tabs 504-509 connected in a series arrangement with three negative (anode) tabs 504-506 connected to three positive (cathode) tabs 507-509 through the bus bas 502. In this embodiment, the battery chemistry is lithium-ion and the cathode experiences a higher potential as compared to the anode which experiences a lower potential. Accordingly, the tabs 507-509 may be thicker than the tabs 504-506. As a result, the bus bar 502 may include an offset 520 to accommodate the greater thickness of the tabs 507-509 at their stacked segment 522 as compared to the thickness of the tabs 504-506 at their stacked segment 524.

The housing 526 includes an opening 528 through which the tabs 504-506 extend. The stacked segment 524 of the tabs 504-506 includes segments 530 that extends through the opening 528 and at which the tabs 504-506 are substantially proximate one another. The segments 530 are oriented substantially normal to the surface 532 of the housing 526. Bends 533 adjoin the segments 530 so that distal segments 534 of the tabs 504-506, which are situated away from the connection with the cells 102, are folded and overlay the housing 526. The distal segments 534 are oriented substantially parallel to the surface 532 of the housing 526 and embody the terminal ends of the tabs 504-506.

The housing includes another opening 542 through which the tabs 507-509 extend. The stacked segment 522 of the tabs 507-509 include segments 536 that extend through the opening 542 and at which the tabs 507-509 are substantially proximate one another. The segments 536 are oriented substantially normal to the surface 532 of the housing 526. Bends 538 adjoin the segments 536 so that distal segments 540 of the tabs 507-509, which are situated away from the connection with the cells 102, are folded and overlie the housing 526. The distal segments 540 are oriented substantially parallel to the surface 532 of the housing 526 and embody the terminal ends of the tabs 507-509. The stacked segments 522, 524 are disposed in a bi-directional folded orientation pointing toward one another. In other embodiments, the stacked segments 522, 524 are fold unidirectionally in a common direction to be disposed in a single common orientation. Folding in a single common direction enables carrying out the folding in a single common fixture. However, folding bi-directionally positions the stacked segments 522, 524 closer together than using a single common direction. Closer proximity enables the use of a smaller bus bar 502.

The bus bar 502 is coupled with the stacked segments 522, 524 such as by welding, fastening, or other means of providing an electrical coupling joint. In the current embodiment, the bus bar 502 is made of copper or an alloy thereof, the tabs 504-506 are made of copper or an alloy thereof, and the tabs 507-509 are made of aluminum or an alloy thereof. The aluminum tabs 507-509 may have a layer, such as the aluminum oxide layer 208 of FIGS. 2-4, which complicates coupling and may be a factor in leading to undesirable porosity. It has been found that placing the bus bar 502 on the outside of the tabs 504-509, which is a location opposite the housing 526, facilitates laser welding and produces coupling joints 546, 548 with minimal porosity.

In the current embodiment, a cavity 550 is formed in the surface 532 of the housing 526 proximate the coupling joint 546 and a cavity 552 is formed in the surface 532 of the housing 526 proximate the coupling joint 548. The cavities 550, 552 provide a void for any overshoot of welding energy through the inside tabs 506, 507 to protect the housing 526, and ultimately to protect battery cells 511-516 from receiving any laser energy. By directing the laser weld first through the bus bar 502 and then into the tabs 504-509, the laser energy is first introduced to the bus bar 502 and then to the tabs 504-509. This results in improved welding, and avoids the creation of excessive porosity in the aluminum tabs 507-509.

Figure 6:
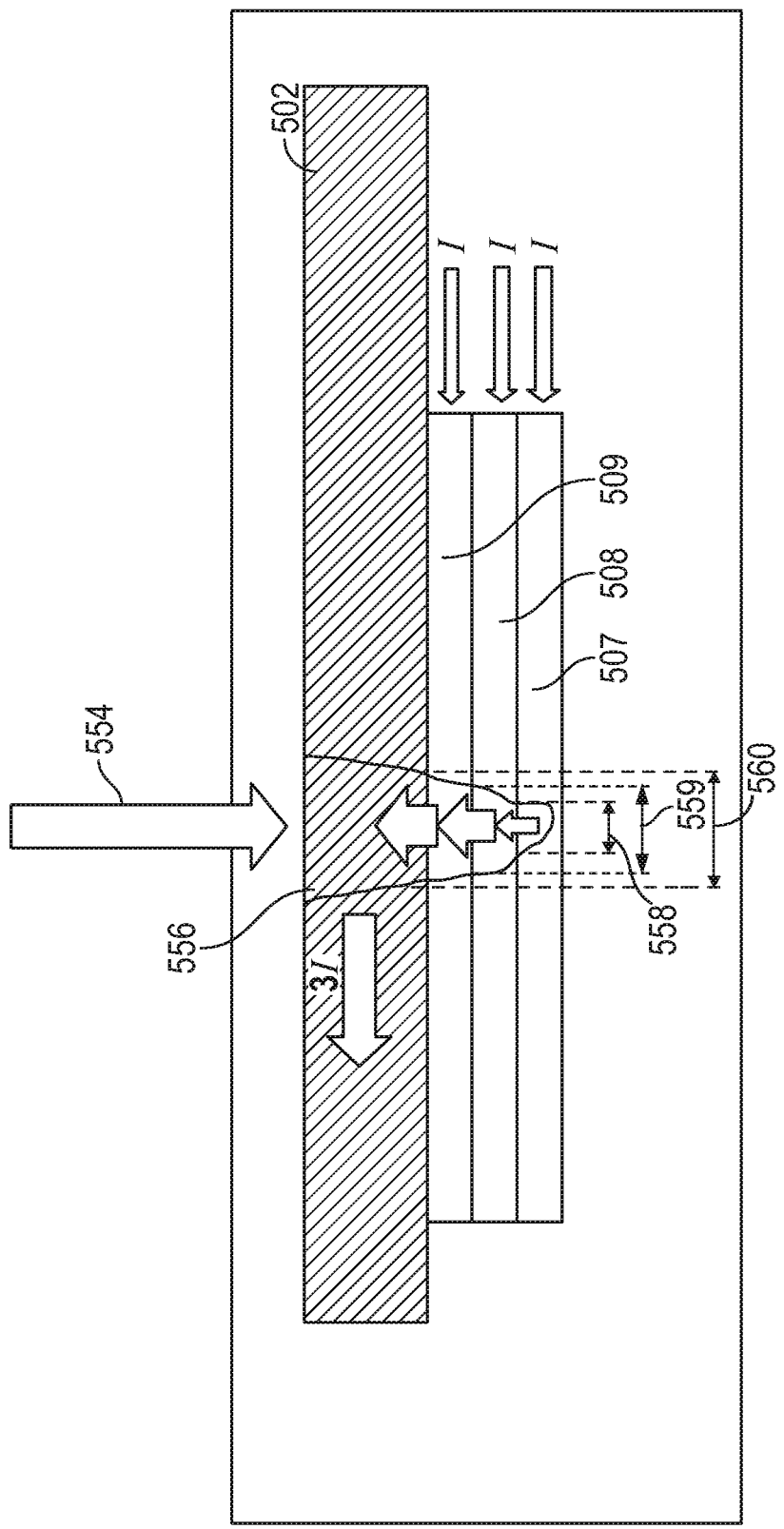
FIG. 6 is a schematic, cross sectional illustration of a coupling joint of the battery module of FIG. 1, in accordance with various embodiments.

As illustrated schematically in FIG. 6, the laser weld beam 554 is introduced first to the bus bar 502, after which it progressively penetrates the tabs 509, 508 and 507. As the beam 554 penetrates the stack, its energy diminishes and creates a weld 556, which becomes progressively narrower with depth. More specifically, the weld 556 is narrower at the area 558 of the tab 507 then at the at the area 560 of the bus bar 502. Similarly, the weld 556 is wider at the tab 508 than at the tab 507 and is wider at the tab 509 then at the tab 508. This inverted, semi-conical shaped weld 556 means that the aluminum tabs 507-509 are subjected to less energy and produce less porosity than if the beam 554 were applied directly to them. In addition, the shape of the weld 556 provides a larger path for current flow as current progressively increases through the weld interfaces in direction noted by arrows in FIG. 6 due to connection of tabs 507-509 in parallel. More specifically, the weld 556 carries a current of 1I through the weld interface 558, carries a current of 2I through the weld interface 559, and carries a current of 3I through interface 560 and into the bus bar 502. Desirably, the current carrying area of the weld 556 increases as the current level being carried increases.

Figure 7:
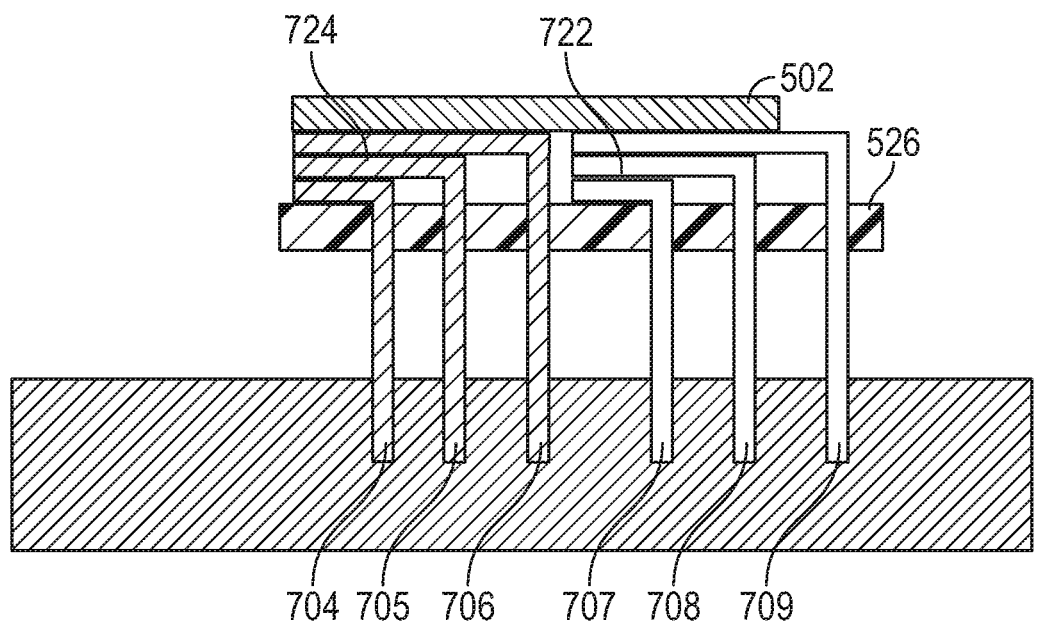
FIG. 7 is a schematic, cross sectional illustration of part of a battery module with unidirectionally folded tabs, in accordance with various embodiments.

Referring to FIG. 7, an embodiment with unidirectionally folded tabs 704-709 is shown. It should be understood that the illustrations of FIGS. 7-10 are simplified schematics meant to show arrangements or configurations. As such, depictions of cell pouches/bodies, slots and voids in plastic frame, tab bends, etc. may not be depicted. In FIG. 7, the bus bar 502 is located on an opposite side of the tabs 704-709 from the housing 526. In this example, the tabs 704-706 are made of copper or a copper alloy and the tabs 707-709 are made of aluminum or an aluminum alloy. The bus bar 502 may be made of a single material such as aluminum or copper. In this example, the tabs 704-709 are folded using a single fixture to form the stacked sections 722, 724 which are disposed between the housing 526 and the bus bar 502. Folding the tabs 704-709 unidirectionally simplifies the folding process but may require a bus bar 502 that is larger to reach over the stacked sections 722, 724.

Figure 8:
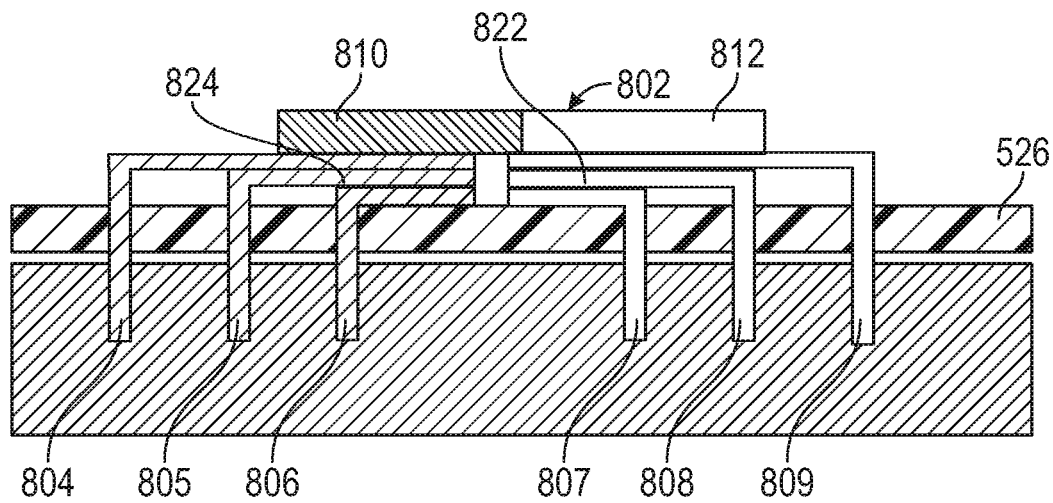
FIG. 8 is a schematic, cross sectional illustration of part of a battery module with bi-directionally folded tabs and a bimetallic bus bar, in accordance with various embodiments.
Figure 9:
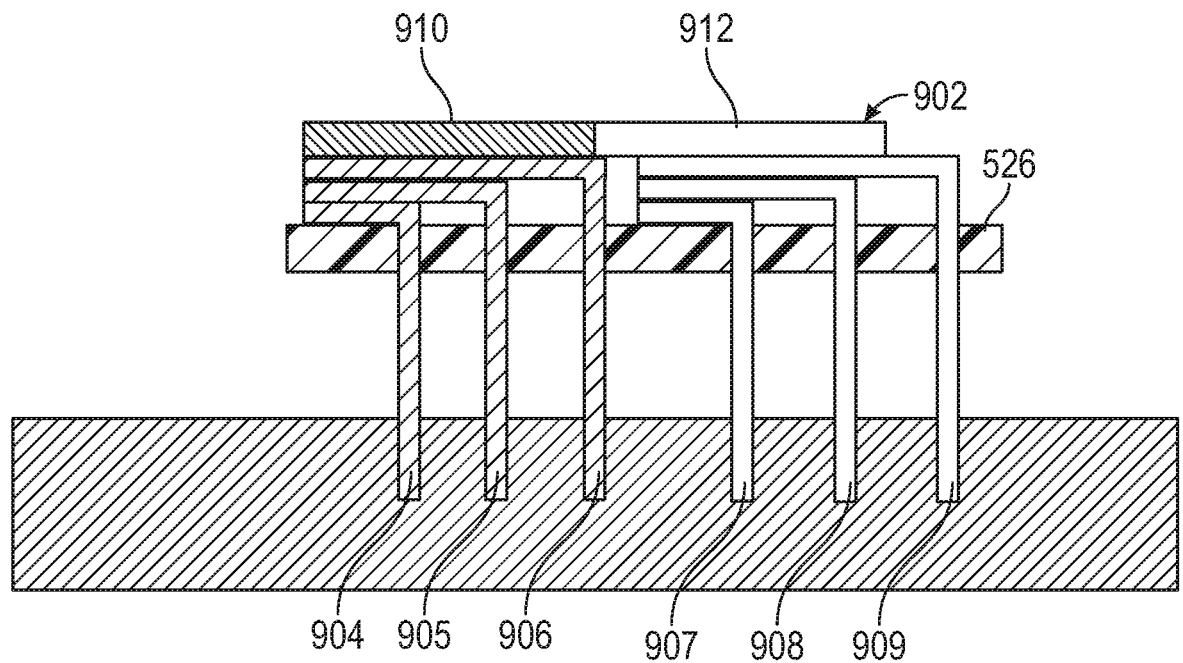
FIG. 9 is a schematic, cross sectional illustration of part of a battery module with unidirectionally folded tabs and a bimetallic bus bar, in accordance with various embodiments.

An embodiment as shown in FIG. 8 includes bi-directionally folded tabs 804-809. The bus bar 802 is located on an opposite side of the tabs 804-809 from the housing 526. In this example, the tabs 804-806 are made of copper or a copper alloy and the tabs 807-809 are made of aluminum or an aluminum alloy. The bus bar 802 may be of a bimetallic material. For example a section 810 of the bus bar 802 is made of copper or copper alloy to match the material of the tabs 804-806 and is disposed proximate thereto. A section 812 of the bus bar 802 is made of aluminum or aluminum alloy to match the material of the tabs 807-809 and is disposed proximate thereto. Using a bimetallic bus bar 802 presents similar metals for coupling, which simplifies welding. In this example, the tabs 804-806 are folded in opposite directions relative to the tabs 507-509 to form the stacked sections 822, 824 which are disposed between the housing 526 and the bus bar 502. Folding the tabs 804-809 bi-directionally and arranging them facing toward one another enables a bus bar 802 that is relatively small to reach over the stacked sections 822, 824. In addition, the bus bar 502 may need to reach over only a portion of the stacked sections 822, 824 to make the coupling joints. In the embodiment of FIG. 9, the bus bar 902 is again bi-metallic with a copper or copper alloy area 910 proximate the copper or copper alloy tabs 904-906 and an aluminum or aluminum alloy area 912 proximate the aluminum or aluminum alloy tabs 907-909. In the example of FIG. 9, the tabs 904-906 are folded unidirectionally with the tabs 907-909. The bus bar 902 may need to extend over only a portion of the tab 909 to make the coupling joint with the tabs 907-909.

Figure 10:
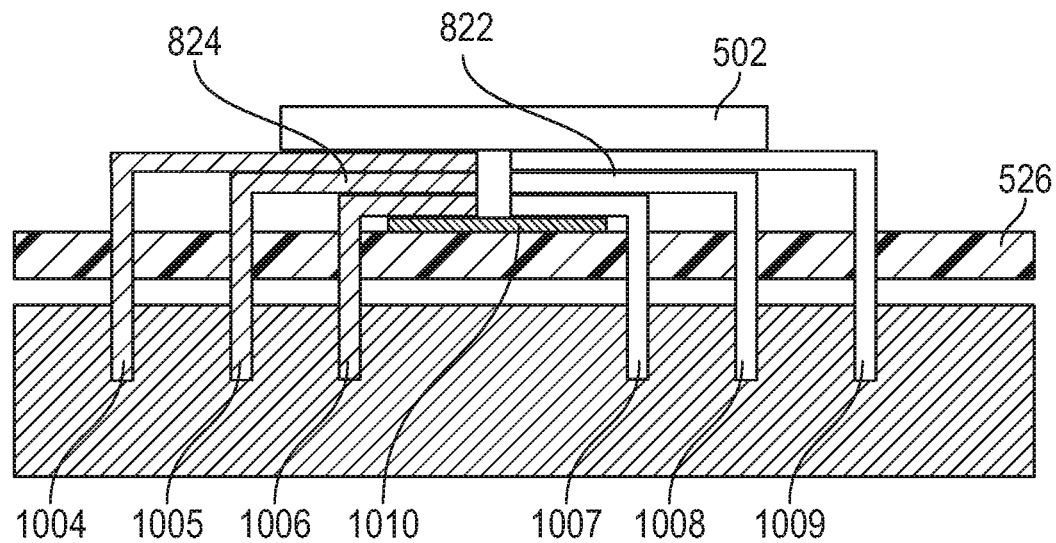
FIG. 10 is a schematic, cross sectional illustration of part of a battery module with bi-directionally folded tabs and a terminal, in accordance with various embodiments.

In an embodiment of FIG. 10, tabs 1004-1006 are folded in an opposite direction relative to the tabs 1007-1009. The bus bar 502 is disposed outside the tabs 1004-1009 and opposite the housing 526. A terminal 1010 is disposed on or adjacent to the housing between the tabs 1006 and 1007. The terminal 1010 may be made of a like metal as the cell tabs, such as copper or aluminum, which may be integrally connected to circuitry capable of monitoring battery cell voltage for state of charge estimation. A welded connection between terminal 1010 and tab 1006 and/or 1007 can made through the laser weld process. The terminal 1010 also provides protection for the housing 526 and cell pouches from any overshoot of welding energy through the inside tabs 1006, 1007.

Figure 11:
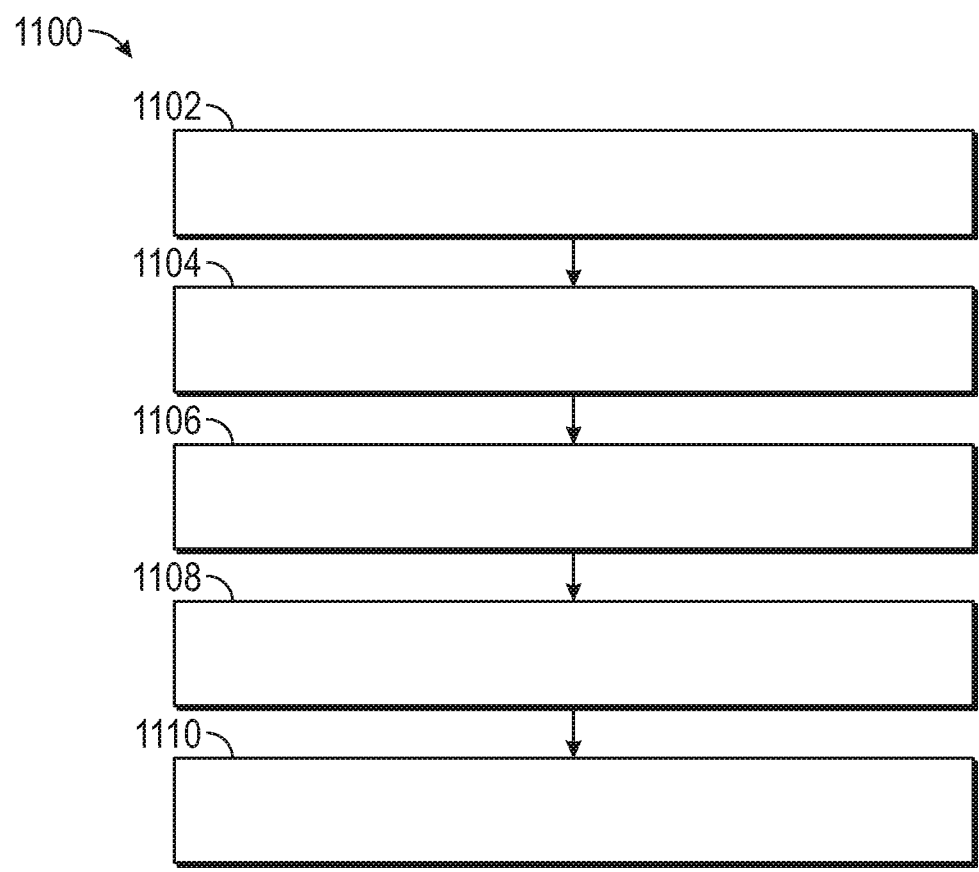
FIG. 11 is a flow chart of a battery assembly process, in accordance with various embodiments.

A process 1100 for the assembly of a battery, such as the battery module 100 of FIG. 1 is illustrated in flow chart form in FIG. 11. The process 1100 begins with cell assembly 1102 such as the assembly of cells 102 of FIGS. 1-2 with tabs 504-509. The tabs 504-506 are collected in a group proximate one another to be ganged together and the cells 102 with tabs 504-506 are then added 1104 to a frame/housing 526 with the tabs 504-506 extending through the opening 528. Alternatively, a frame/housing may be added to the assembly/stack of cells 102. The collection of tabs 507-509 may be done simultaneously with, or independently from, the tabs 504-506. In either case, the tabs 507-509 are collected in another group proximate one another to be ganged together. The addition of the frame/housing 1104 may be done in a single step over both tabs 504-506 and 507-509. Depending on the format of the cells, there may be one or two housings in a given cell assembly. The subassembly may be completed in a fixture (not shown), or the cells 102 may be added to the housing 526 and then loaded in the fixture. The fixture may be where the tabs 504-509 are folded 1106 to overlie the housing 526. The tabs 504-506 may be folded 1106 separately from the tabs 507-509 or all tabs 504-509 may be folded 1106 simultaneously. The bus bar 502 is positioned 1108 against the tabs 504, 509 on an opposite side of the tabs 504-509 from the housing 526. The laser welding apparatus 202 directs two energy beams, sequentially or simultaneously, 204 to create welds 556 of the bus bar 502 to the tabs 504-506 and the bus bar 502 to the tabs 507-509 as coupling joints, coupling 1110 the tabs 504-509 with the bus bar 502. The energy beam 204 penetrates the bus bar 502 first, and then the tabs 504-506, 507-509. In some embodiments the tabs 504-506 and folded the same direction as the tabs 507-509 and in some embodiments, the tabs 504-506 are folded in an opposite direction from the tabs 507-509. In some embodiments, the bus bar 502 is made of one material and in other embodiments, the bus bar 502 is bimetallic. In some embodiments, cavities 550, 552 are formed in the housing 526 proximate the welds 556. In some embodiments, a terminal 1010 is positioned between the tabs 506, 507 and the housing 526. Additional parts, such as isolation covers or structure parts may be assembled after welding is completed. The module 100 is completed and may be assembled in a battery pack.

Accordingly, battery assemblies and methods include a number of cells that have tabs coupled to a bus bar. The bus bar is disposed on an opposite side of the tabs from a housing, with a coupling joint between the bus bar and the cells. The coupling joint may be formed by a laser weld shot first into the bus bar and then through the bus bar and into the tabs. The bus bar location enables the use of thinner and smaller bus bars and shorter cell tabs. Laser welding from the busbar side reduces the porosity of the joints and provides an optimal current path for the operating battery. Bi-directional tab folding further enables smaller busbar size.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An assembly comprising:
   a number of cells, each cell having at least one tab for coupling the cell in the assembly;
   a housing having an opening through which each tab extends, the tabs folded to overlie an outer surface of the housing;
   wherein the tabs are disposed in gangs and each of the gangs presents a flat area of stacked tabs outside the housing, each flat area comprising a plural number of the tabs from a plural number of the cells folded in a common direction, with the housing adjacent to and directly exposed to the flat area of the tabs; and
   a bus bar disposed on an opposite side of the tabs from the housing at the flat area, with a coupling joint between the bus bar and the cells, wherein the coupling joint comprises a weld bead initiated through the bus bar, and the weld bead extending into each of the stacked tabs.

2. The assembly of claim 1, wherein the weld is wider in the bus bar than in the tabs with the weld terminating in the flat area of the stacked tabs, the weld configured so that a current carrying area of the weld increases in size as a current level being carried from the cells through the weld increases.

3. The assembly of claim 1, wherein the tabs are disposed proximate one another when extending through the opening and outside the housing are folded approximately parallel to the outer surface.

4. The assembly of claim 1, wherein at least one tab comprises a cathode configured to carry a first potential and having a first respective flat area of a first thickness and at least one tab comprises an anode configured to carry a second potential that is lower than the first potential and having a second respective flat area of a second thickness that is less than the first thickness, and wherein the bus bar includes an offset between the tab comprising copper and the tab comprising aluminum to accommodate the first and second thicknesses.

5. The assembly of claim 1, wherein the bus bar comprises one of a bimetallic material or a homogenous material.

6. The assembly of claim 1, comprising a void formed by the housing, the void disposed proximate the coupling joint and opening toward the tabs, to avoid overheating of the housing.

7. The assembly of claim 1, comprising a terminal disposed between the housing and the tabs, wherein the terminal is configured to couple the tabs to remote circuitry to monitor voltage of the cells, wherein the gangs include a first gang folded in a first direction and a second gang folded in a second direction that is opposite the first direction, wherein the terminal contacts the first gang and the second gang.

8. The assembly of claim 1, wherein at least one tab comprises aluminum with an outer oxide layer.

9. The assembly of claim 1, comprising a module, wherein a number of the cells are assembled in a module with the tabs aligned along the module.

10. The assembly of claim 1, wherein the tabs are folded in one of a bi-directional orientation where at least one tab is folded opposite at least one other tab or in a unidirectional orientation where the tabs are folded in a common direction.

11. A method of assembling a battery comprising:
forming a number of cells, each cell having at least one tab for coupling the cell in the battery;
extending each tab through an opening of a housing;
folding the tabs to overlie an outer surface of the housing;
arranging the tabs in gangs with each of the gangs presenting a flat area of stacked tabs outside the housing, each flat area comprising a plural number of the tabs from a plural number of the cells folded in a common direction, with the housing adjacent to and directly exposed to the flat area of the tabs;
positioning a bus bar on an opposite side of the tabs from the housing at the flat area; and
forming a coupling joint between the bus bar and the at least one tab by initiating a weld bead through the bus bar, and the weld bead then extending into each of the stacked tabs.

12. The method of claim 11, wherein forming the coupling joint comprises forming the weld wider in the bus bar than in the tabs; terminating the weld in the flat area of the stacked tabs with a current carrying area of the weld increasing in size as a current level being carried from the cells through the weld increases.

13. The method of claim 11, comprising forming a stacked section of the tabs where the tabs are ganged together, are disposed proximate one another and are folded approximately parallel to the outer surface.

14. The method of claim 11, wherein at least one tab comprises copper and at least one tab comprises aluminum, and comprising forming an offset in the bus bar between the tab comprising copper and the tab comprising aluminum.

15. The method of claim 11, comprising forming the bus bar of a homogenous material.

16. The method of claim 11, comprising forming a void in the housing, the void disposed proximate the coupling joint and opening toward the tabs.

17. The method of claim 11, comprising positioning a terminal between the housing and the tabs, wherein the terminal comprises a material that resists weld energy.

18. The method of claim 11, comprising assembling a number of the cells in a module with the tabs aligned along the module.

19. The assembly of claim 11, comprising folding at least some of the tabs opposite other tabs in a bi-directional folded orientation, pointing toward one another or the folding at least some of the tabs unidirectionally pointing in a common direction.

20. A battery assembly comprising:
a first group of cells, each cell in the first group of cells having a tab, the tabs of the first group of cells ganged together to have a first stacked section where the tabs of the first group of cells are disposed adjacent one another;
a second group of cells, each cell in the second group of cells having a tab, the tabs of the second group of cells ganged together to have a second stacked section where the tabs of the second group of cells are disposed adjacent one another;
a housing having a first opening through which the tabs of the first group of cells extend, and having a second opening through which the tabs of the second group of cells extend, the tabs of the first group of cells folded to overlie an outer surface of the housing, and the tabs of the second group of cells folded to overlie the outer surface of the housing;
wherein the tabs are disposed in gangs and each of the gangs presents a flat area of stacked tabs outside the housing, each flat area comprising a plural number of the tabs from a plural number of the cells folded in a common direction, with the housing adjacent to and directly exposed to the flat area of the tabs, wherein a first gang includes the tabs from the first group of cells and a second gang includes the tabs from the second group of cells; and
a bus bar disposed on an opposite side of the tabs from the housing at the flat area, with a first coupling joint between the bus bar and the tabs of the first group of cells, and a second coupling joint between the bus bar and the tabs of the second group of cells, wherein the coupling joints comprise welds, wherein the coupling joint comprises a weld bead initiated through the bus bar, and the weld bead extending into each of the stacked tabs.

* * * * *